Nov. 3, 1931.  H. W. ALDEN  1,829,725
CHANGE SPEED DRIVING AXLE CONSTRUCTION
Filed July 1, 1929
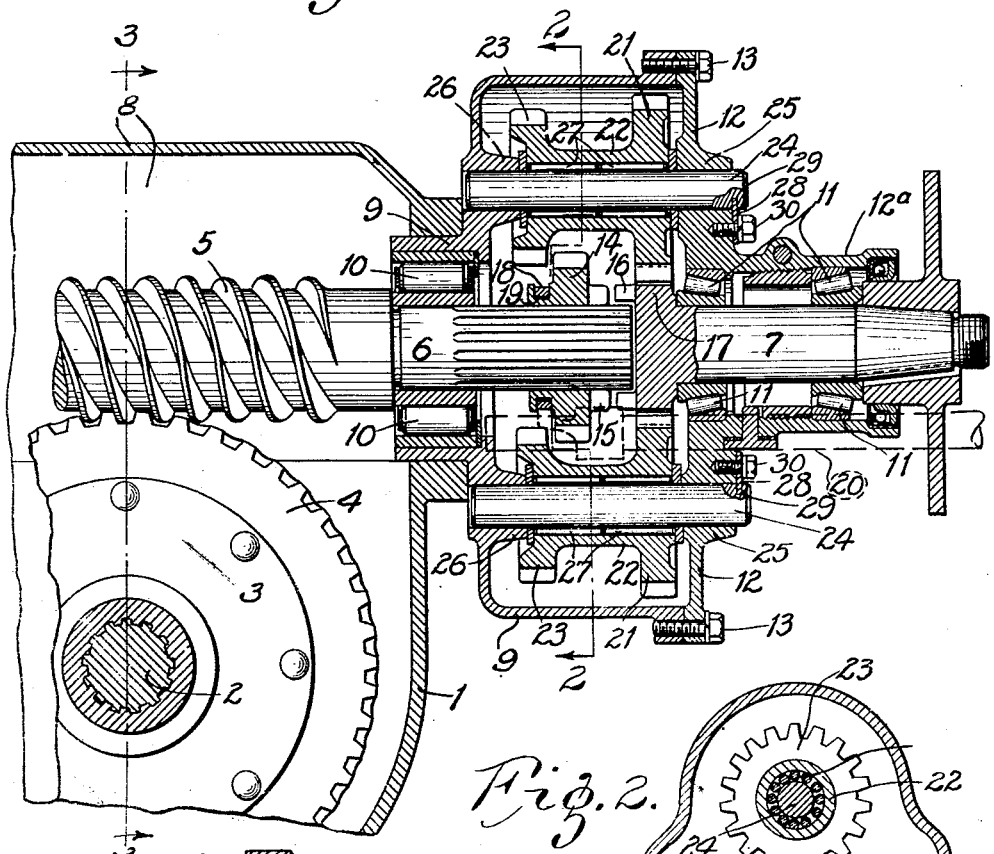
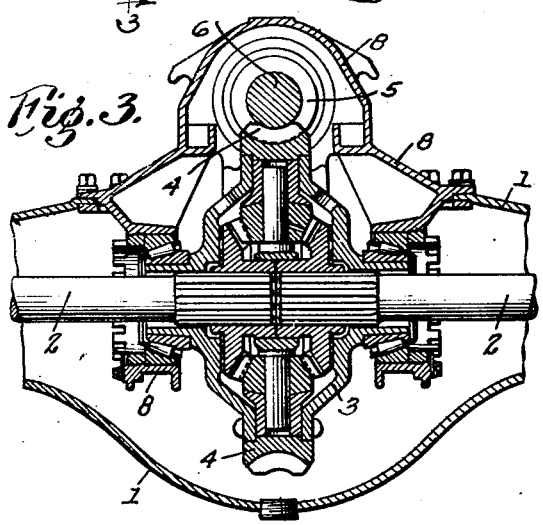
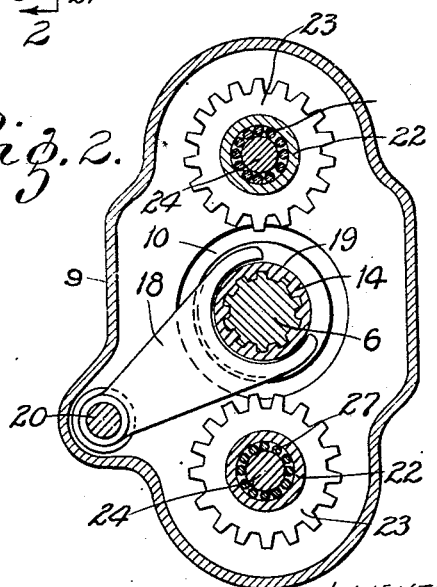
Herbert W. Alden, INVENTOR
by Carr Han & Gravely,
HIS ATTORNEYS.

Patented Nov. 3, 1931

1,829,725

UNITED STATES PATENT OFFICE

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO

CHANGE SPEED DRIVING AXLE CONSTRUCTION

Application filed July 1, 1929. Serial No. 375,033.

This invention relates to change speed automobile driving axle constructions adapted to provide speed changing means in addition to the variable speed transmission gearing of the vehicle. The invention has for its principal objects to provide for the housing of the auxiliary change speed gearing in the differential gear carrier of the axle housing; to neutralize the side pressure on the driving shaft of said gearing and thereby eliminate side thrust on the bearings for said shaft; and to provide for simplicity and cheapness of construction and compactness of design.

The invention consists in the change speed driving axle and in the construction, combination and arrangements of parts hereinafter described and claimed.

In the accompanying drawings, which form part of this specification and wherein like symbols refer to like parts wherever they occur, Fig. 1 is a vertical transverse section through the middle portion of a differential driving axle equipped with change speed gearing embodying my invention;

Fig. 2 is a vertical cross-section on the line 2—2 in Fig. 1, and

Fig. 3 is a vertical longitudinal sectional view on the line 3—3 in Fig. 1.

Referring to the accompanying drawings, my invention is shown in connection with an automobile driving axle comprising a tubular casing or housing 1 containing axially alined driving axle or shaft sections 2 and a suitable differential mechanism 3 for driving said sections. Mounted on the differential mechanism 3 and forming part thereof is a worm gear ring 4 which meshes with a worm 5 on the inner section of a pair of axially alined inner and outer propeller or drive shaft sections 6 and 7, respectively. As shown in the drawings, the differential mechanism 3 and the propeller shaft sections 6 and 7 are mounted in a differential carrier 8 removably secured to the axle housing, whereby said differential mechanism and said propeller shaft sections are removable with said carrier as a unit. In the construction shown, the propeller shaft sections 6 and 7 are located above the ring gear of the differential and are rotatably supported in a forwardly projecting housing or hollow nosing 9 of the differential gear carrier.

The outer end portion of the worm or inner propeller shaft section 6 is rotatably supported in a suitable roller bearing 10 seated in the shaft receiving opening in the rear wall of the hollow nose portion 9 of the differential gear carrier 8. Tapered roller bearings 11 of an adjustable type are used for rotatably supporting the outer or forward propeller shaft 7 in an outstanding tubular housing 12a formed integral with a closure plate or cap 12, which is removably secured, as by cap screws 13, to the outer end of the nosing 9 of the differential carrier 8.

Splined on the outer end portion of the inner or worm shaft section 6 is a slide gear 14 having clutch teeth 15 on its side face adapted to cooperate with similar clutch teeth 16 on the opposing side face of a drive gear 17 on the inner end of the outer propeller shaft section 7. The slide gear 14 is adapted to be moved longitudinally of the inner propeller shaft section 6 by means of the usual clutch fork 18 which cooperates with an annular groove 19 provided therefor on the side face of said gear. The clutch fork 18 is fixed to a shifter rod 20 which is disposed parallel to the propeller shaft sections and is mounted for longitudinal sliding movement in bearings provided therefor in the rear wall of the hollow nosing 9 and the closure member 12 therefor.

The drive gear 17 on the inner end of the outer propeller shaft section 7 meshes continuously with two diametrically opposite gears 21 on spools 22, each of which has another gear 23 thereon adapted to mesh with the slide gear 14 on the inner propeller shaft section 6. The two spools 22 extend parallel to the propeller shaft section and are preferably disposed one above and the other below the drive gear 17 and slide gear 14. As shown in the drawings, the two diametrically opposed spools 22 are rotatably supported in the nosing 9 of the carrier 8 on counter shafts 24 that are supported in bearings 25 and 26 in the rear wall of the nosing and in the closure member 12 for said nosing. Antifriction members 27, preferably roller bearings are interposed between the spools 22 and their supporting shafts 24. Said counter shafts are held against axial movement in their supporting bearings preferably by means of locking plates 28 that seat in transverse grooves 29 provided therefor in the outer ends of said shafts and are removably secured to the front face of the closure member 12 by means of cap screws 30.

By the arrangement described, when the slide gear 14 is out of engagement with the inner gears 23 of the spools and the drive gear 17 no motion is imparted to the inner propeller shaft section 6. When said slide gear is clutched with said drive gear, the two propeller shaft sections are thus directly connected together, thereby securing a direct drive between the two sections. When said slide gear 14 is slid inwardly to bring it into mesh with the two diametrically opposed inner gears 26 of the spools, the inner propeller shaft section 6 is indirectly driven from the outer propeller shaft section 7 at a reduced rate of speed, the drive being from the drive gear 17 on said outer propeller shaft section to the two diametrically opposed outer gears 21 of the spools and thence through the two diametrically opposed inner gears 23 thereof and said slide gear to said inner propeller shaft section.

The hereinbefore described change speed driving axle is simple and economical and easy to manufacture and assemble. It is strong and durable and contains a minimum number of parts; and it provides space within the differential gear carrier for compactly housing the change speed gearing which can be removed with the carrier as a unit. The location of the continuously driven spool gears on opposite sides of the drive gear on the propeller shaft serves to relieve the propeller shaft bearings of excessive side thrust by neutralizing the side pressure on said shaft, thereby increasing the smoothness of action of the gearing.

Obviously, the hereinbefore described construction admits of considerable modification without departing from the invention. Therefore, I do not wish to be limited to the precise construction shown and described.

What I claim is:

1. A driving axle construction comprising a housing, axle shaft sections journaled in said housing, differential mechanism operatively connecting said axle shaft sections, and having a worm gear, a carrier for said differential mechanism, said carrier being removably secured to said axle housing and being provided with a housing that has spaced roller bearings in its front for a propeller shaft section and a roller bearing for the front end portion of a second propeller shaft section, axially alined propeller shaft sections mounted in said bearings, the inner propeller shaft section having a worm that engages the worm gear of said differential mechanism to drive the same, a drive gear fixed to the outer propeller shaft section, gears journaled in said carrier housing on opposite sides of said outer propeller shaft section and intermeshing with the drive gear thereon, gears concentric to and rotatable with said last mentioned gears, and a slide gear splined on said inner propeller shaft section and adapted to be intermeshed with the gears that rotate with the gears intermeshed with said drive gear or clutched with said outer propeller shaft section.

2. A driving axle construction comprising a housing, axle shaft sections journaled in said housing, differential mechanism operatively connecting said axle shaft sections, a carrier for said differential mechanism, said carrier being removably secured to said axle housing and being provided with a housing that has spaced roller bearings in its front for a propeller shaft section and a roller bearing for the front end portion of a second propeller shaft section, axially alined propeller shaft sections mounted in said bearings, the inner propeller shaft section being operatively connected with said differential mechanism to drive the same, a drive gear on the inner end of the outer propeller shaft section having clutch teeth on its inner face, counter shafts mounted in said carrier housing alongside of said propeller shaft sections and equidistant from each other, two gears on each of said counter shafts, one of the two gears on each counter shaft intermeshing continuously with the drive gear on said outer propeller shaft section, and a slide gear splined on said inner propeller shaft section and adapted to be intermeshed with the other of the two gears on each counter shaft and having clutch teeth in its outer face arranged to engage the clutch teeth of the drive gear on the outer propeller shaft section.

3. A driving axle construction comprising a housing, axle shaft sections journaled in said housing, differential mechanism operatively connecting said axle shaft sections, a carrier for said differential mechanism, said carrier being removably secured to said axle housing and being provided with a housing that has spaced roller bearings in its front for a propeller shaft section and a roller bearing for the front end portion of a second propeller shaft section, axially alined propeller shaft sections mounted in said bearings, the inner propeller shaft section being operatively connected with said differential mechanism to drive the same, a drive gear fixed to the outer propeller shaft section, counter shafts mounted in said carrier housing parallel with and on opposite sides of said propeller shaft sections, spools journaled on said counter shafts and provided with two gears, one gear of each spool meshing continuously with the drive gear on said outer propeller shaft section, and a slide gear splined on said inner propeller shaft section and adapted to be intermeshed with the other gear of each spool or clutched with the drive gear on the outer propeller shaft section.

4. A change speed driving axle construction comprising a housing, axle shaft sections journaled in said housing, differential mechanism operatively connecting said axle shaft sections and comprising a worm ring gear, a carrier for said differential mechanism, said carrier being removably secured to the axle housing and being provided with a housing having its outer end open, a closure member for said opening, axially alined inner and outer propeller shaft sections, the inner propeller shaft section being journaled in said carrier housing and having a worm cooperating with said worm ring gear of said differential mechanism to drive the same, the outer propeller shaft section being rotatably supported in spaced taper roller bearings mounted in said closure member, a drive gear fixed to the outer propeller shaft section, counter shafts disposed in said carrier housing parallel with and on opposite sides of said propeller shaft sections, one end of each of said counter shafts being supported in the wall of said carrier housing and the other end thereof being supported in said closure member, two gears on each of said counter shafts, one of said gears meshing continuously with the drive gear on said outer propeller shaft section, and a slide gear splined on said inner propeller shaft section and adapted to be intermeshed with the other of said counter shaft gears or clutched with the drive gear on the outer propeller shaft section.

Signed at Detroit, Michigan, this 6th day of June, 1929.

HERBERT W. ALDEN.